United States Patent

Fiala et al.

[11] 4,012,535
[45] Mar. 15, 1977

[54] MOLASSES IMPREGNATED BAGASSE PITH ANIMAL FEED

[75] Inventors: Richard J. Fiala, Decatur, Ill.;
Thomas L. Scott, Raceland, La.;
Kenneth N. Wright, Decatur, Ill.

[73] Assignee: A. E. Staley Manufacturing Company, Decatur, Ill.

[22] Filed: Sept. 3, 1974

[21] Appl. No.: 502,470

[52] U.S. Cl. .............................. 426/658; 426/623; 426/636

[51] Int. Cl.$^2$ ......................................... A23K 1/02

[58] Field of Search .......... 426/623, 635, 654, 658, 426/807, 454, 456, 472, 473, 636

[56] References Cited

UNITED STATES PATENTS

| | | | |
|---|---|---|---|
| 610,258 | 9/1898 | Cochran | 426/635 |
| 707,113 | 8/1902 | Hughes | 426/635 X |
| 1,184,228 | 5/1916 | Carter | 426/635 X |
| 1,286,742 | 12/1918 | O'Rourke | 426/635 |
| 1,360,174 | 11/1920 | Brown | 426/635 |
| 1,497,461 | 6/1924 | Oliver | 426/623 |
| 2,319,579 | 5/1943 | Black | 426/635 X |
| 2,377,360 | 6/1945 | Musher | 426/635 X |
| 2,707,151 | 4/1955 | Martin | 426/623 |
| 2,733,145 | 1/1956 | Karr | 426/635 X |
| 2,744,824 | 5/1956 | Lent | 426/635 X |
| 2,786,760 | 3/1957 | Bonnafoux | 426/454 |
| 2,947,632 | 8/1960 | Kruse | 426/623 X |
| 3,573,924 | 4/1971 | Zarow | 426/635 X |
| 3,745,017 | 7/1973 | Queal | 426/464 X |

Primary Examiner—Robert Halper
Attorney, Agent, or Firm—Howard J. Barnett; Charles J. Meyerson

[57] ABSTRACT

A process for making a dense, high molasses animal feed impregnated on a ground bagasse or bagasse pith carrier. The ground bagasse or bagasse pith is capable of absorbing up to about 5 times by weight high brix molasses to produce a feed product having about 30–55% by weight sugars determined as invert. The ground bagasse or bagasse pith, from which the major portion of the cane juice has been removed for the manufacture of cane sugar, is thoroughly mixed with molasses and the wet mixture, which contains from about 15–30% by weight water, is wet pelleted. Uniform penetration of molasses throughout the carrier is obtained. The molasses/bagasse (bagasse pith) pellets are then dried to a moisture level less than about 2–4% and cooled. The dry, dense pellets can then be packed and shipped without further processing, or they may be subjected to a crumbling step to make a granular product for blended animal feeds and as a principal component in molasses/salt blocks, and medicated feeds.

22 Claims, 5 Drawing Figures

MOLASSES IMPREGNATED BAGASSE PITH ANIMAL FEED

BACKGROUND OF THE INVENTION

Sugar mills in southern Louisiana and in Florida generate large amounts of bagasse, which is a fibrous, pithy by-product of the sugar cane processing. A major part of the U.S. production of cane sugar is from the sugar mills in the Mississippi river delta and Bayou Teche regions of Southern Louisiana. The principal cane harvest there is from about October through January, and the quantity of bagasse by-product builds up to the point where it represents a major disposal problem.

In the past, this bagasse has been burned as an additional source of energy for the sugar refining process. However, almost all the sugar mills have switched over to natural gas because it is dependable, easy to control, and significantly reduces air pollution. With the complete changeover to natural gas heat sources, the surplus bagasse by-product has created a disposal problem of substantial proportions at the sugar mills.

Storage the bagasse, or using it for landfill are not satisfactory answers to the problem, because the delta country is low and flat, and valuable for additional sugar cane production. The prices obtained for sugar have increased steadily with demand, especially since purchases from Cuba have been effectively cut off, so all available sugar producing land is needed.

During the past twenty-five years, many different proposals for using the surplus bagasse have been explored. It has been used in various animal feed combinations, and numerous studies have been made to evaluate the weight gain value in livestock fed large quantities of bagasse (which is primarily ligno-cellulose pith and fibers). Findings were generally inconclusive. Other forage materials were as good or better in most livestock diets, and in some tests, the bagasse-containing diets were not as desirable as conventional forage materials, even for maintenance diets.

Many attempts have been made to up-grade the nutritional value of bagasse, and varying degrees of success have been reported, but when attempts were made to combine bagasse with molasses (also a by-product of the sugar milling industry) the handling of the resulting hygroscopic mixture was an immediately evident problem.

The bulky nature of the bagasse had always been a deterrent to extensive use in animal feeds, and its low utilization value as a nutrient was a further obstacle to serious efforts to use it. Other feed carriers, such as bran and soybean hulls were at first reasonably priced, so little was done to tackle the problem, and to reduce the ever-building bagasse surplus.

Always hovering close at hand was the thought bagasse might be upgraded by recombining it with blackstrap molasses, another sugar mill by-product. Such a blending at or near the sugar mill would incur no shipping costs, and little handling cost for either raw material component, so numerous intermittent attempts have been made to develop bagasse/molasses animal feed combinations. The rationale behind these efforts was well based, because the high nutrient value of blackstrap molasses in livestock feeding programs was already well known, but even dehydrated molasses is hygroscopic, and tends to lump and clump to a sticky, unmanageable mass after exposure to humid air for even a short time.

When soybean hulls, or other millfeed carriers, such as bran or corn wet milling by-products were used as a molasses feed carrier, it made most sense to ship the dense molasses in tank cars to the location of the more bulky carrier, and do the blending steps at the location, usually a region of temperate climate, average or low relative humidity, and generally cooler temperatures than are experienced the greater part of the year in Southern Louisiana, and in most sugar cane growing areas of the world. Such regions include those areas in latitudes up to approximately 30° north or south of the equator in locations where topography, rainfall and temperature combine to give the tropical, humid climate required for good sugar cane production. Sugar cane regions include: Southern Louisiana and Florida, and also Hawaii, many Caribbean Islands, Central and Northern South America, parts of Mexico, Spain, China, Australia, Indonesia, Philippines, India, Pakistan and the Replubic of South Africa.

The relative humidity in the Mississippi delta country where most U.S. sugar mills are located is rarely below 50%. The climate is considered "tropical", with frequent heavy rainfall. The delta is adjacent to North America's principal source of rain and snow, and a good part of that rain falls back onto the sugar cane country throughout the year without ever leaving the Gulf of Mexico. Any can molasses derived material, therefore, has an unusually good opportunity to exhibit its moisture loving characteristics in the locale of its origin. In spite of the handling difficulties, attempts have continued to combine molasses and bagasse.

The prices of other molasses carriers, such as soybean hulls, have increased drastically over the past 25 years, with major increases in the last 2 years. As recently as 1950, soybean hulls sold for about $10.00/ton; the 1971 price was about $43.00/ton; and, in 1973, a price for this same animal feed carrier was about $80.00/ton. This phenomenal increase is believed due largely to the great success soybean hulls have enjoyed as a nutritional carrier for animal feeds, but they are getting "out of sight". By comparison, in 1971 bagasse sold for about $3.96/ton, less than one tenth the cost of soybean hulls. It can be seen there was a substantial economic incentive to find successful ways to utilize the ever increasing supply of bagasse. The State of Louisiana has invested substantial sums to explore possible uses for this material. A substantial study has been made in Pakistan to determine nutritional value in livestock feed. A major South African sugar milling company has formed a special company to utilize bagasse in animal feeds, and apparently has an interest in a second company which will design and build bagasse/molasses animal feed factories adjacent to sugar mills. In Puerto Rico, a major U.S. oil company invested in a fibre board factory which utilizes bagasse as the major raw material. A sugar mill near Tampa, Florida set up a facility for making animal feeds from bagasse/molasses combinations. All of these ventures have been faced with substantial obstacles inherent with bagasse and molasses handling, and climate (humidity) has contributed, too. The various ventures have enjoyed only a modicum of success, and many have "hung it up". The most promising possibility for using bagasse under present world economic conditions appears to be in the field of animal feeds.

The advantages of locating the sugar cane country are obvious cost savers in handling and shipping both the molasses and the bagasse. The bagasse, as it comes from the mill, is fluffy and difficult to handle. The molasses is normally placed in tanks for shipping, and requires a fairly high level of special technique to be handled efficiently. There are special storage problems, and in some instances molasses stored in Hawaii has been known to self-ignite and explode in storage, and thereafter burn, destroying a substantial portion of the valuable commodity. Other similar self-ignition storage losses have been reported in the Caribbean and at Puerto Rico.

Another good reason for avoiding shipment of molasses long distances is the fact that it normally contains about 20–30% by weight water. If it is possible to remove the water, while retaining the valuable nutrients of the molasses in the resulting animal feed, a substantial shipping cost can be avoided.

DESCRIPTION OF THE PRIOR ART

A large number of methods for preparing and handling molasses-containing animal feeds have been published. The typical problems with handling molasses are reported in the literature and the solutions proposed are equally diverse in numbers, as are the reported levels of success. The main efforts regarding treatments for molasses seem to be to improve its handling properties by combining it with some other ingredient which absorbs the molasses to alleviate its sticky, hygroscopic properties.

The problem of bagasse disposal was appreciated as early as 1869, when M. S. Bringier, of Ascension Parish, Louisiana was granted a patent for a bagasse animal feed. His patent disclosure briefly describes preconditioning the crude bagasse by cutting it into small pieces, and then softening the mass by the action of steam, or by an infusion of hot or cold water. This was the extent of the modification, however, and no suggestion was made to combine the bagasse with molasses.

A dried, bagasse/molasses pressed cake cattle feed is described in U.S. Pat. No. 707,113, issued Aug. 19, 1902 to George H. Hughes. The patentee states that he prefers a ratio of about 20% dry pith to 80% of molasses, but proportions may vary. The bagasse pith/molasses mixture is subjected to further drying at a temperature of about 212° F. The patent mentions that hard outer fiber is discarded, but the pith is used in the subject animal feed composition.

Lucien J. P. M. Y. Dupire of St. Pol, France described a cattle food containing bagasse and molasses in his U.S. Pat. No. 713,620 issued in 1902. His "molasses-cakes" employed straw, hay, wood, reeds, bagasse or the like as his vehicle and chopped and boiled it for about a half hour in a caustic soda solution (1°–2° Baume), and then washed. He then allows the vehicle material to macerate in 15% quicklime for several days, followed by another wishing. The object of the above procedures is to remove resinous or gummy substances from the vehicle. Optionally, the alkali treated vehicle is reduced to a pulp or left in filament form. It is then mixed with up to about 60% by weight molasses and pressed to form cakes, and dried. The dried cakes can be fed "as is", or they can be crumbled and mixed with other feeds.

Dupire does not identify the source of his "bagasse", and, at that time, it may have been the offal from sisal production, In any event, his preparatory treatments are elaborate, and would be considered too costly at the present time. Molasses absorption levels were not excessively high, and he made a point of saying that his vegetable substances, after alkali treatment could be left in "filaments of greater or lesser length."

U.S. Pat. No. 1,360,174 (issued in 1920) proposed combining molasses with sugar cane tops. This patent mentions that proposals had already been made to combine molasses with dried vegetable fibers, including bagasse. the parent states, however, that bagasse and bagasse pith are "substantially devoid of food value" and served merely as an absorbent and carrier for the molasses. The patentee describes the cane tops as having nutrient value, and mixes about 70 parts by weight of molasses with about 30 parts by weight of dried cane tops. The composite animal feed is then dried to about 6–8% moisture and baled.

U.S. Pat. No. Re: 24,261 dated Dec. 25, 1956 (originally issued Apr. 26, 1955, Original No. 2,707,151) describes a high molasses concentration animal feed, and a drying technique to obtain a "dry, nonhygroscopic, pellet form" animal feed which "is storage stable, readily handleable and inexpensively transportable." The filler may be present in amounts from 20–65% and the molasses may range from 80–35%. With more than 80% molasses, it is difficult to obtain sufficient pressure during the extrusion to attain the necessary temperatures to flash steam from the mixture. The "fillers" listed include ground grain mill screenings, sugar beet pulp, sugar beet seeds, peanut hulls, cottonseed hulls, alfalfa, citrus pump ground corn cobs or mixtures thereof, Bagasse and bagasse pith are not included in the extensive list of fillers, and it is reasonable to conclude that the omission was intentional. The wet product is subjected to short, high temperature cycles by forcing it through an extrusion plate to cause rapid release of steam from the extruded material, which is then rapidly cooled to a temperature below that at which molasses chars or caramelizes. The extrusion cycle is repeated until the moisture content of the product is reduced to the desired level, preferably less than 5%. This reference also describes a hard and smooth surface film on the periphery of the pellets, thought to be polymerized resins present in the molasses. The hard film is said to contribute to the increased resistance the pellets have to absorption of water from the atmosphere.

The hygroscopic property of molasses is recognized, and allegedly solved by a tapioca additive as a minor ingredient to animal feeds combining molasses and a "comminuted substance having a high protein content, such as soybean, cottonseed, corn or other meal, cottonseed bulk or chopped hay, or a mixture of two or more substances." (See U.S. Pat. No. 3,033,684 issued May 8, 1962). A second, desirable minor ingredient is saponin, which accelerates drying during mixing, according to this patentee. The main function of the tapioca is reported to be that it forms a fine water-resistant film on each particle of the mixture. The tapioca is also said to cause the mixture to dry progressively as the mixing proceeds.

Food pelleting, utilizing as a binder waste liquors from the digestion of wood, and other plant products, including bagasse (cane pulp), is described in U.S. Pat. No. 3,035,920 issued May 22, 1962 to Cloy B. knodt. The preferred binder is the alkaline earth base spent sulfite wood liquors. No other mention is made of bagasse, even though a detailed list of feed ingredients is set forth (see column 3, lines 37–60 of above patent). The pelleting process, however, is described in some detail. A 50 H.P. California flatbed pellet mill was used having 3/16 inch die openings. The wet feed was at about 10–20% moisture and a temperature or 40°–150° F., and the feed rate to the pellet mill was about 3 tons per hour. The feed mix is applied to the top surface of the die plate and forced under pressure of rotating rollers into and through the die openings. The pelleted feed is cooled by blowing air through the pellets as they pass on a foraminous conveyor. The pellets become "hard and dry", but the final moisture level is not disclosed.

A method of pelleting dehydrated molasses is described by Albert J. Zarow in his U.S. Pat. No. 3,573,924 issued Apr. 6, 1971. In his process, he describes first preheating the admixture to be pelleted to a predetermined temperature and then introducing live steam for lubrication and to control precisely the moisture content of the pellets (15%). The dehydrated molasses employed is described (Example II) as containing a pellet binder, and anti-caking agent, a lubricant and a source of carbonhydrate (55% by weight cane molasses, 43% corn cob fractions, and 2% added vegetable fat). After admixing this with urea, the final molasses content of the formed pellets was about 20–22% by weight. Zarow also mentions that when a moisture level of 16.5% by weight is reached in the pelleting process, the mixture is soft, gummy and difficult to handle. His process shows no post-pelleting drying step.

A variation on sugar cane utilization as animal feed was disclosed by Ralph W. Bishop in U.S. Pat. No. 3,568,511 issued June 22, 1971. Bishop's process comminutes the whole cane, dried it to a low moisture content and then pelletizes it. Bishop harvests, grinds, and dries the cane plant to 1–3% moisture, and thereafter partially rehydrates the dried feed by injecting wet steam into the pelletizing apparatus, or water can be added from molasses or a crude sugar solution. In this patent, the moisture content at the time of pelleting the comminuted cane plants was about 3–8%, and the "sugar content" in one example was reported to be 43%. In no instance was the extruded pellet dried after pelletizing.

Sprout-Waldron Co. Inc. has published a report on a bagasse pelleting facility operated by Unites States Sugar Corporation, Clewiston, Florida (Sprout-Waldron Co., Inc. *Pointers for Profit*, Volume F-15, 1972). The subject publication describes the process as utilizing raw bagasse which has been dried from 50 down to 5% moisture. About 10–12% molasses is added at the feeder conditioner for the pellet mill, and the pellets are dried and cooled before packing. The molasses addition was reportedly made primarily as a binder and pelleting lubricant, and for the side benefit of enhancing palatability. Calculations based on typical 79.5° Brix molasses at 12% levels added 5% moisture bagasse shown that the total moisture content of the admixture entering the twin pellet mills is about 6–8%, or relatively low moisture level. The pellet mills are rated at 250 horsepower, and maximum output of the pair is reported as 12 tons of pelleted feed per hour.

Keith E. Queal disclosed a technique of directly steaming a feed carrier, such as cane bagasse to improve the absorption of a sweetening agent on the carrier (see U.S. Pat. No. 3,745,017 issued July 10, 1973). Cane sugar molasses is mentioned as one sweetening agent. The mixing temperature is from 150°–225° F., and the blend is thereafter dried by conventional means. Example XIX of this patent shows a granular, free-flowing product combining cane sugar molasses on a cane bagasse carrier, which analyzed at 46.9% total sugar calculated as invert.

SUMMARY OF THE INVENTION

Our molasses/bagasse (bagasse pith) animal feed manufacturing facility is conveniently located near the bagasse (bagasse pith) source. In our particular circumstances, and adjacent paper manufacturing plant utilizes sugar cane bagasse fibers to make paper, and separates out a bagasse pith by-product. The paper making process is believed to follow that described in U.S. Pat. No. 3,216,886 issued Nov. 9, 1965, entitled "Process for the Preparation of Bagasse Fibers". For paper making, the bagasse fibers which are separated from the pith should be "as long and as strong as possible" impart the greatest possible strength to the paper. The separating process affects the bagasse pith residue in several important ways which are believed to improve the usefulness of the pith in making high molasses pellets, crumbles and molasses/salt blocks.

According to the subject patent, the crushed, juiceless sugar cane bagasse by-product from sugar mills is moistened at moderately elevated temperatures to a moisture level of about 20–60% by weight, on a "as is" basis so that the fibers and pith soften and swell, but do not swell to the extent that they form a slurry. The moistened bagasse material is then subjected to a two-step milling operation in an attrition mill of the single or double rotating disc type. In the first step, a large portion of the pith is separated from the bagasse fibers. In the second milling stage, the discs are spaced more closely, and the remaining adherent pith is almost completely separated from the fibers. The longer bagasse fibers are collected for use in the manufacture of paper, and the bagasse pith residue was formerly used as fuel or frequently discarded.

The formerly discarded pith residue is the carrier presently used for the molasses/bagasse animal feed of the subject invention. However, we are prepared to use whole bagasse as a carrier when required. The pith is conveyed directly from the paper mill into our animal feed manufacturing facility where it is subjected to a series of conditioning steps, and is then thoroughly blended with molasses and extruded and dried to make dense, high molasses pellets. It is understood that various vitamins, minerals, medicaments, and other additives may be blended with the wet molasses/pith mixture prior to extrusion and drying of the wet pellets.

The high molasses pellets can be fed to cattle, or the pellets can be crumbled for blending with other livestock feeds. The crumbles can also be formed into molasses/salt blocks with or without the addition of other ingredients. When added, such other ingredients may include various vitamins, minerals, medicaments and other additives, including insecticides and larvicides, which pass through the animal's system, and prevent insect infestation and propagation of insects and their larvae in the manure.

In the process steps, the pith (substantially defibered) is first dehydrated to about 3–5% moisture by being air conveyed through a dehydrator which is heated to a temperature of 170°–220° F. The dehydrated pith is then subjected to a milling (hammermill) step to further reduce the size of the fibers remaining from the paper mill processing. The hammermill includes a 3/32 inch screen, and only that portion of the pith which will pass through this size screen is conveyed on through the system. The over-sized portion is recycled for further milling in the hammermill to reduce the over-sized portion to usable particle size.

The dried, sized pith is then conveyed through a pith conditioner, and into a blender where it is mixed with high brix molasses prior to pelletizing. The molasses is first received at about 20-30% by weight moisture, 79°-85° Brix, and 50-55% sugar expressed as invert. Before blending with the bagasse pith the molasses is first preheated to a temperature in the range of 140°-180° F. by a steam injection system which heats the molasses as it is atomized and sprayed into the blender.

The molasses is intimately blended with the conditioned bagasse pith in the blender at a ratio of about one to four parts by weight molasses to about one part by weight of the pith carrier. The blender is maintained relatively cool, at a temperature in the range of about 110°-120° F. The blender is provided with a means to keep the molasses in the blender long enough to mix thoroughly with the pith.

The high molasses/pith mixture is then fed into a continuously operating pellet mill, which is also held at a temperature of about 110°-120° F. We are presently using a California pellet mill having 3/16 inch diameter die orifices, which have 1¼-1¾ inch long bores through which the molasses/pith mixture is extruded to form wet pellets. The extruded pellets break, or are cut, and fall by gravity onto an endless belt. The belt then conveys the wet pellets through a dryer/cooler system where dehumidified cooling air is circulated around the dry pellets. Dehumidification has been found necessary in the Louisiana humidity to cool the hot, dry pellets. The wet pellets are dried preferably to less than 2% moisture from the wet pellet moisture level of about 15% moisture or above. The cooling of the pellet by means of a cool, dry air stream was not initially contemplated, and is probably not necessary in geographic regions of low humidity, but the high levels of humidity which prevail at the plant location have made the dehumidified cooling necessary in order to get a product which is sufficiently cool and dry for crumbling and packing.

Instead of packing and shipping the dried pellets, they may be reduced to a granular product by crumbling in crumble rolls, grinding devices, impact mills or in a hammermill, or any combination of these. A dense, granular product is obtained from the grinding or crumbling, and it is then screened to uniform particle size with a bulk density of about 35 lbs./cu.ft.

The crumbled and screened product can then be bagged, or it can be fed to a block making operation where it can be compressed into a dry molasses/salt block which uses the crumbled product as a major ingredient. A technique for making molasses/salt blocks is disclosed in U.S. Pat. No. 3,246,336 issued to Baribo et al. on Apr. 12, 1966. The above patent is assigned to a common assignee herewith.

GENERAL DISCUSSION

Figure 1:
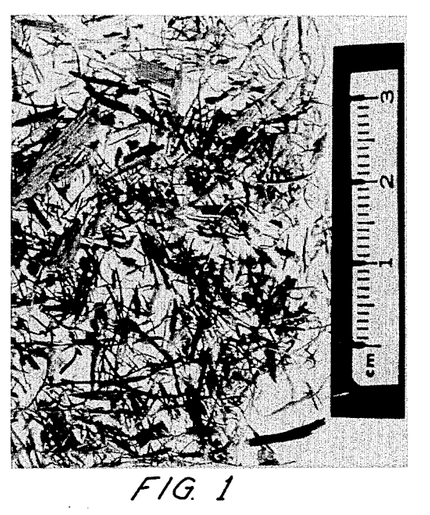
FIG. 1 of the drawings is a photomicrograph of the fibrous bagasse pith as received from the paper mill prior to grinding.

As shown in FIG. 1 of the drawings, the bagasse pith received from the paper mill still includes fibers which are relatively long. The incoming pith is dried to about 3-5% by weight moisture, and is then ground and screened through a ⅛ inch screen. (A hammermill is used for pregrinding the bagasse pith). It is contemplated that cane bagasse, directly from the sugar mill can be preconditioned in the same manner as the bagasse pith from the paper mill, the only difference being the length of time the cane bagasse will require to pass through the pregrind step and the screening step, since none of the large fibers have been removed, as is the case with the bagasse pith received from the paper mill.

The pregrinding step is considered most important when long fibers, such as those seen in FIG. 1, are present. It has been observed in experiments with impregnating "as is" bagasse and bagasse pith containing long fibers that the longer fibers do not absorb molasses, and they interfered with the forming of dense, uniformly impregnated pellets. When attempts were made to dry what pellets could be formed from whole bagasse, the pellets broke up in the drier, and crumbled into a high percentage of fines. However, when the bagasse or bagasse/pith was ground and screened so that substantially all long fibers were removed, a uniform, homogeneous high level molasses absorption was obtained throughout the extruded pellets, and it became difficult to distinguish fibers from pith in the pellets formed from the preconditioned mixture. These wet pellets retained their form during drying, with very little crumbling, and substantially no fines were evident in the dry product.

It is presently believed that this major improvement in pellet forming and molasses absorption can be attributed to the physical structure of the cane fibers in the bagasse. In the cane plant, the fibers are found in the fibrovascular bundles surrounded by the parenchyma which contain the interstitial pith cells.

The fibers form the cane plants' circulation system for transferring liquid nutrients between the roots, stem and leaves of the plant. The fibers also serve some support function for the sugar cane plant and are basically tubular, strawlike members having relatively impervious side walls to best perform the liquid nutrient transfer function. The primary means for absorbing molasses into such fibers is therefore believed to be by capillary action. Therefore, the grinding substantially increases the absorption potential of the pith by greatly increasing the number of openings in the tubular fibers into which liquid molasses can be absorbed. The average fiber length, being greatly decreased, improves substantially the number of fibers which can absorb a full capacity of molasses.

The pith cells are generally spongy, porous and quite absorptive, but benefit from the preconditioning, particularly the dehydration step, because the high level of moisture already absorbed in the pith must first be removed to obtain effective high level molasses absorption.

Moisture levels can also vary widely, and it has been determined by trial that the preferable moisture range for the preconditioned bagasse pith is from 3-5% by weight water. It has been our experience that the moisture level of the incoming bagasse pith has generally been much higher than this, and requires dehydration in the dehydrator as shown in FIG. 5.

DETAILED DESCRIPTION OF THE INVENTION

Figure 5:
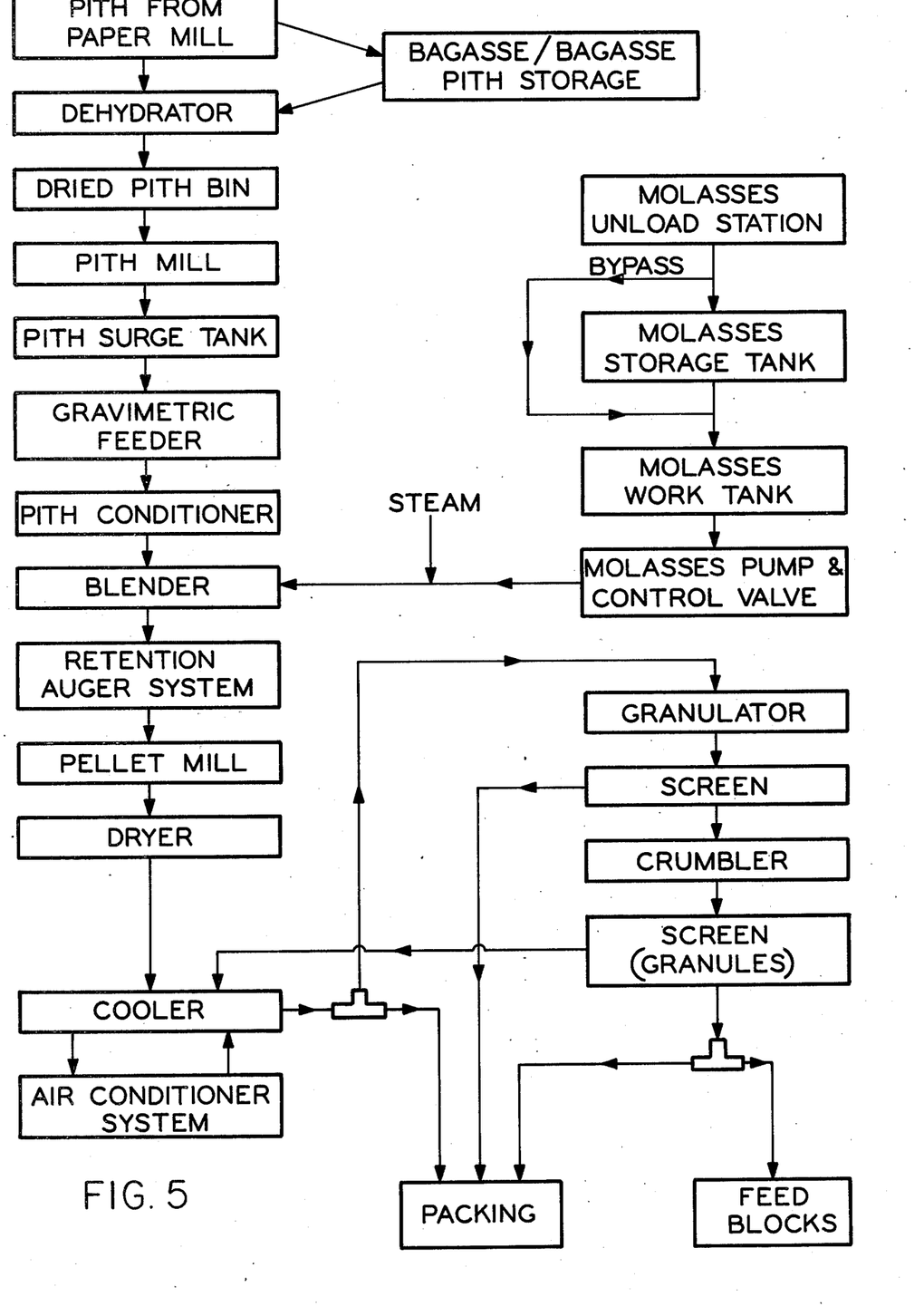
FIG. 5 is a flow sheet which shows the sequence of steps followed to make the high molasses pellets and crumbles.

In the present animal feed production facility, bagasse pith is received from the paper mill as indicated on the flow sheet, FIG. 5. The bagasse pith is at a relatively high moisture level, due to the high absolute moisture content of the surrounding air. A moisture level of 45-60% by weight for incoming bagasse pith is not uncommon.

As pointed out above, the process of the invention may also utilize bagasse as it comes from the sugar mills with some additional initial grinding and preconditioning required, and other carriers may be blended with the bagasse or bagasse pith carriers, depending on availability, desirability and cost. Such other high molasses carriers include: sugar beet pulp, sugar beet seeds, soybean hulls, citrus pulp, corn cob fractions, alfalfa and other forage materials, ground grain mill screenings, peanut hulls, cottonseed hulls, and dried ground portions of whole sugar cane plants. The presently preferred carrier for reasons for convenience and cost is bagasse pith obtained from the adjacent paper mill.

The bagasse pith obtained from the paper mill results from the separation technique employed at the paper mill to separate the longer cane fibers for use in high quality paper. Cane bagasse is fed into a hammermill provided with screens which retain the desirable long fibers and allow passage of the shorter fibers and bagasse pith. The bagasse is pneumatically conveyed through the hammermill where the pith is removed from the fiber by two rotating shafts with hammers attached. The lighter pith is pulled through the screen, while the fiber is pulled straight through the mill. The moisture level of this separated bagasse pith may range as high as 30-60%, and the temperature will generally be that of the surrounding atmosphere, which may vary from about 40° F. up to 100° F. Some minor residue of sugar may be present in the bagasse pith, but it is quite hygroscopic and ferments readily, so that it does not usually present any major problem.

The bagasse pith from the paper mill is conveyed to an enclosed belt conveyor (24 inches wide, and 275 feet long). Depending on existing operating requirements in the animal feed manufacturing facilities, the incoming bagasse pith can be diverted to storage or fed directly by gravity into a self-feeding system, and to a dehydrator where the bagasse pith is heated to about 190°-205° F., and dried to about 3-5% moisture. The self-feeder system measures 10 feet wide by 20 feet in length, has a variable speed drive, two horsepower drag, and a five horsepower picker and screw which empties into a 16 inch wide drag conveyor having a two horsepower drive.

The drag conveyor feeds into the dehydrator, and the bagasse pith is carried into and through the drum-type dehydrator (10 H.P. MEC 830TG) by recirculated forced air. The pith density is about 6 lbs./cu.ft.

The dried pith is then discharged from the dehydrator and is pneumatically conveyed by a 75 horsepower, MEC No. 80 fan up into a 96 inch diameter cyclone collector which empties through an electrically operated valve into an enclosed dry pith, live-bottom bin (1800 cu. ft. capacity).

The live-bottom bin is provided with six 9 inch diameter screws disposed above and transverse to a dry pith auger conveyor, which feeds the dry pith to a gravity outlet past a magnet for removing tramp metal, and into a pith mill (MEC Corporation, Model No. 2445-270 Hammermill, 150 HP). The pith mill is provided with a 3/32 inch screen to screen out excessively large particles and recirculate the oversize fibers and pith fragments back through the pith mill for further grinding. To insure that no long fibers get through the pith mill, a 3/32 inch screen is used. However, a ⅛ inch screen has proved adequate in present practice using bagasse pith from the paper mill which has substantially all long fibers removed.

The hammermill pneumatically discharges up into a first stage, 60 inch diameter cyclone collector, which size classifies the milled pith. The "unders" are gravity-/air fed through an airlock (¾ HP Carter-Day No. 10, at 30 RPM) down to a bucket elevator (11¾ 33 39 inch bucket elevator; 52 feet vertical lift, 1½ H.P., capacity 2692 lbs. dry material/hr.). The "overs" are air fed to a second stage, 60 inch diameter cyclone collector through a 40 horsepower fan (MEC Corporation No. 40, 3600 RPM). The "overs" from the second stage cyclone collector are recirculated into the large cyclone collector (96 inch diameter). Any "overs" from the large cyclone collector are discharged to waste through a discharge system which is driven by a 75 horsepower fan (MEC Corporation No. 80).

The "unders" from the second stage cyclone collector are also air fed to the bucket elevator (previously mentioned). The combined "unders" are then transferred to a pith surge tank.

The milled, classified bagasse is carried up to and dumped in the pith surge tank (160 cu. ft. hopper) which is a holding chamber for insuring a constantly available supply of dry pith to a pith conditioning screen conveyor. The pith surge tank is emptied by twin 9 inch screw feeders (1 HP at 7-56 RPM). An 18 inch gravimetric meter (Ω horsepower) is disposed in the conduit below the screw feeders. The gravimetric meter is a flow control device for controlling the amount of pith flowing into the pith conditioner.

The pith conditioner (12 inch stainless steel screw conveyor, 12 feet long, 5 HP) is provided with a steam inlet, not used at present, and the pitch conditioner delivers the preconditioned pith to a pith/molasses blender (50 HP Hayes & Stoltz Hi-Speed Blender, capacity 9953 lbs./hr.).

Molasses is also supplied to the pith/molasses blender. A 500,000 gallon molasses storage tank gives a degree of buying flexibility so that market trends can be used to advantage. From the storage tank the molasses is fed into a 2,600 cubic foot molasses work tank (19,400 gal. capacity) provided with an external steam jacket. The molasses received here typically contains 15-25% moisture (79.5°-85° Brix), the higher solids level molasses are generally preferred, but availability is a factor, and the equipment will handle the normal range of Brix levels now being marketed.

The molasses is preheated to about 100°-130° F. in the work tank to improve flow characteristics, and is then pumped through a molasses supply conduit to the pith/molasses blender by means of a molasses pump (7.5 H.P.) having a capacity of about 7261 lbs. molasses/hr. The molasses supply conduit is also provided with a molasses "hydro heater" disposed adjacent the discharge into the blender. The "hydro heater" includes a steam injection system for atomizing the liquid molasses (with some additional heating) as it is supplied to the blender where it is intimately admixed with the dried, preconditioned pith.

The blended admixture of preconditioned bagasse pith and molasses is then discharged by way of a retention screw device (12 inch stainless steel transversely disposed screws, 12 foot long conveyor, 7½ H.P. drive). The retention screw insures that the molasses/pith admixture is retained in the blender long enough to become thoroughly blended, and for the molasses to become completely absorbed by the preconditioned, ground pith and fibers of the carrier material. The retention screw discharges by gravity down into a 9 inch diameter auger feeder system which supplies the pellet mill by means of a gravity chute.

The feeder system includes a 14 foot long horizontal auger having a first discharge outlet about ¾ of its length from the retention screw inlet. A second outlet at the end of the horizontal auger discharges into a vertical disposed lift auger, which carries excess blended molasses/pith material back into the retention screw device where it is recycled as needed back down into the auger feeder system. The auger feeder recirculation system effectively prevents excess build up of the molasses/carrier admixture in the pellet mill gravity feed chute.

The gravity feed chute connects the variable speed feeder (Model M-22). The feed conditioner is disposed directly above a pellet mill (California Pellet Mill, No. 4100, 150 H.P. drive, Model M-23 die feeder) having a ring type die with a plurality of die openings (3/16 inch diameter, 1½ inch bore, recessed ½ inch).

The absorbed molasses/bagasse pith carrier admixture being received at the pellet mill is preferably at a temperature of from 110°–120° F., although materials at temperatures ranging from 100°–130° F. can be handled well. The moisture level of the admixture should be at least 10% by weight, preferably about 17%, and moisture levels ranging from 10–25% by weight can be successfully pelleted, although other factors, such as humidity have a definite effect on the pelletability of the mixture. Molasses levels may be in a range from about 25 up to 75% by weight, d.s.b. again, with due consideration being given to other related factors. Under present climate conditions (temperature, relative humidity) it has been observed that high production rates of wet pellet forming can be attained when the molasses level is about 88% by weight (high brix molasses, 85° Brix) which can be expressed as about 42.5% sugars (invert).

When it is desirable to add ingredients prior to pelleting, such as vitamins, minerals, medical additives, or insecticides and larvicides, such addition may be conveniently made at the retention screw, or earlier, as determined by the blending properties of the additive, as well as other factors. When a crumbled, granular product is being made, it is convenient to blend most additives after crumbling.

The wet pellets are continuously extruded from the many die openings, and under normal operating conditions, at normal feed rates, the pellets break at lengths ranging from ¼ inch up to about ¾ inch due to gravity. If a more uniform length pellet is desired, a cutter knife is used to continuously cut the extruded pellets as they emerge from the die orifices. The newly formed wet pellets are uniformly impregnated with molasses throughout both the short, chopped preconditioned fiber segments and the pith portions of the molasses carrier material. Surprisingly, the pelleting operation generates very little heat in the moist soft pellets, and a typical wet pellet temperature is about 120° F. with a temperature up to about 135° F. being acceptable, although not usual.

It has been observed that the pellet mill operates very smoothly on the high molasses wet pellets, which typically have a moisture level of about 17% by weight. The pellet mill requires only about one-third its rated power input to produce pellets at its full rated, conventional output, dry solids basis. In effect, there is an energy tradeoff which works to greatly facilitate smooth production. The higher than usual moisture levels in the molasses/pith admixture contribute lubricating effects in the pelleting die, but it is believed the overall efficiency of the wet pelleting operation is improved by the combined or synergistic action of the high molasses level, and the moisture which is primarily bound in the molasses. When lower molasses levels are used and more moisture added to bring the moisture level up to the same level, the pellets so formed are wet and crumbly, and cannot be handled. When attempts were made to pellet the preconditioned pith at these moisture levels, no pellets could be formed, the mass was too wet. A moisture level below about 8% caused die plugging with lower quality pith.

Figure 2:
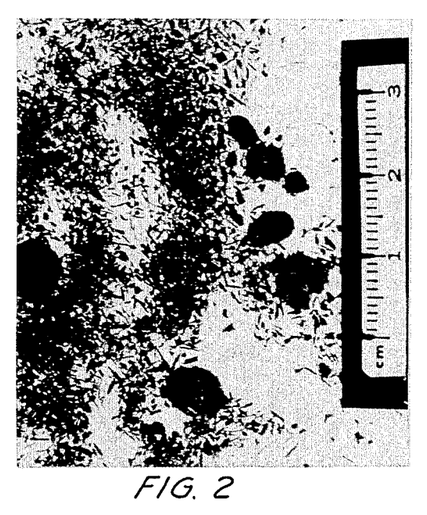
FIG. 2 is a photomicrograph of the molasses impregnated pith after preconditioning and mixing with high brix molasses, and then dried without first pelleting.

The wet pelleting, therefore, at high molasses levels, has proved to be a most efficient technique for obtaining dense, uniformly impregnated hard feed pellets. It is believed that the pressure, moisture and temperature conditions in the pellet mill are ideal for obtaining optimum absorption of molasses in both the bagasse pith and preconditioned, ground fibers. The fiber lengths are apparently short enough to get complete absorption of molasses, possibly by capillary action in the pellet mill. As mentioned before, the simple blending and mixing of molasses and the bagasse pith and preconditioned ground fibers is not sufficient to obtain the complete impregnation of the fibers, because when attempts were made to make such a product, the results were as shown in FIG. 2 of the drawings. The molasses did not seem to penetrate the fibers, but remained on the surfaces as confirmed by microscopic examination. When such a material was dried, it balled up into sticky masses as shown in FIG, 2 and stuck to the walls of the dryer, causing fire hazard.

Figure 3:
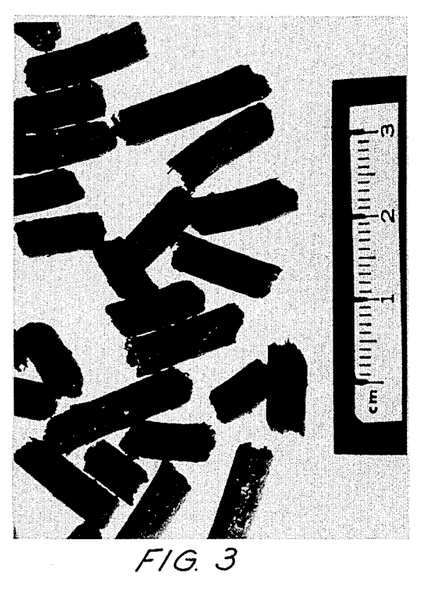
FIG. 3 is a photomicrograph of dense, dry high molasses pellets obtained by pelleting the wet mixture of molasses impregnated pith, and thereafter drying the pellets.
Figure 4:
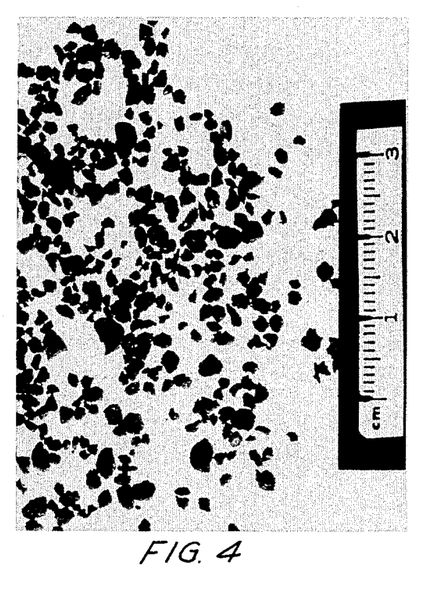
FIG. 4 is a photomicrograph of the dense, high molasses crumbles derived from the pellets such as are shown in FIG. 3.

In contrast, the pelleted wet product is conveniently dried and cooled as described below to provide the firm, dense, high molasses pellets as shown in FIG. 3. As further described below, these pellets may then be subjected to further milling after drying to provide the high molasses uniformly impregnated, dense granular animal feed product shown in FIG. 4 of the drawings. This latter product is desirable as a feed supplement to be blended with other feeds, or as a major component in the molasses/salt blocks which may be manufactured following the general disclosure set forth in U.S. Pat. No. 3,246,336, Baribo et al.

The pellet drying and cooling system described below is required by the climate conditions at the plant location in the Louisiana Delta. Relative humidity there averages around 80, and the normal nighttime temperature for about four months of the summer are above 75° F., with daytime highs often in the high nineties. Under these conditions, absolute humidity content in the air is substantial, and any hygroscopic material will pick up moisture very rapidly.

We have discovered that such climate conditions dictate that the opportunities for moisture pickup by the feed products be cut to the minimum. The process of this invention, with the wet pelleting step does exactly this. Dry pelletizing, as shown in the prior art, provides a fairly long exposure to the humidity of the high humidity atmosphere, and by the time the material is fed from the dryer, and through the conventional dry pellet mill, there has been so much moisture pickup, that a second drying step is still required before the pellets can be crumbled into a granular feed. In addition, it has been our experience that the higher molasses levels cannot be obtained when dry material is fed to the pellet mill. Instead, the molasses crystallizes on the fibrous portion of the bagasse pith carrier, and creates handling problems when one attempts to go above about 30% by weight molasses, based on the dry weight of the bagasse pith carrier.

The initial dryer/cooler system installed in the Louisiana plant, although considered of sound engineering design by consultants, provided inadequate to accomplish the extent of moisture removal from the wet pellets found necessary in actual experience to compensate for moisture pickup by these food products during handling, and even after packing in "moisture-proof" bags, or other containers. In actual experiments, a sample of the granular feed product obtained by crumbling the dried pellets was exposed to laboratory relative humidity of 79 over a period of 30 days. In the tests reported below in Table 1, a humidity chamber was made of a dessicator containing a saturated aqueous solution of ammonium chloride at an ambient temperature of about 74° F. The observed relative humidity in this chamber was about 79°. A ten gram sample was placed in the dessicator, and removed, weighed and replaced at the times indicated. This sample was measured at the times indicated below for moisture content, and the results were as follows:

TABLE 1

| Time Elapsed | | | Moisture Content - Percent |
|---|---|---|---|
| Days; | Hours; | Minutes | by weight of dry solids |
| 0 | 0 | 0 | 1 |
| 0 | 0 | 30 | 1.7 |
| 0 | 1 | 0 | 2.1 |
| 0 | 2 | 0 | 3.0 |
| 0 | 4 | 0 | 4.4 |
| 0 | 6 | 0 | 5.8 |
| 1 | 4 | 0 | 14.5 |
| 2 | 4 | 0 | 17.4 |
| 3 | 4 | 0 | 18.9 |
| 4 | 0 | 0 | 19.7 |
| 5 | 0 | 0 | 20.5 |
| 8 | 0 | 0 | 21.6 |
| 10 | 0 | 0 | 22.4 |
| 15 | 0 | 0 | 22.2 |
| 38 | 0 | 0 | 23.6 |

From the above table, it can be seen that moisture pickup in the granular, high molasses feed is quite rapid. At these humidity conditions, the sample almost doubled its moisture content within 30 minutes after the dry material was exposed to the high relative humidity.

We have found that the wet pelleting and subsequent drying steps in our process provides a substantial increase in dry product bulk density. High density is believed to decrease hygroscopicity of the dry pelleted product. A bulk density higher than about 20 pounds/cubic foot is typical and it ranges up to about 30 lbs/cubic foot, and 28–30 lbs./cubic foot being preferable.

The process for dehydrating the moist pellets had to be improved to meet the adverse humidity conditions prevalent in southern Louisiana. The system designed initially was though adequate, but it was discovered it required the modifications described below to be useful throughout the year.

At the present time, the wet pellets are discharged from the pellet mill onto a conveyor belt (18 inches wide by 15 feet long) which carries the wet pellets at a slightly upward angle away from the pellet mill, and dumps the wet pellets into an oscillatable teflon lined spout, which communicates to the upper horizontal belt of a Model 960 Wenger Dryer (6–7½ H.P. fans and 2-1 H.P. conveyor drives). The pellets are partially dried on this belt, and then drop down onto a second, similar horizontal conveyor belt. The Wenger Dryer provides a steady flow of hot, dry air over and around the pellets. The dryer temperature is maintained in the range of 220°–275° F. by direct fired gas combustion units, and the exhaust air is discharged through the pith dehydrator, where the excess heat is utilized.

After the pellets have been conveyed through the dryer, they are substantially devoid of all moisture, but still at about the temperature (150°–200° F.) at which they left the dryer. The dry, hot pellets then are transferred onto another horizontal conveyor belt (¾ H.P. drive), and passed through an enclosed 24 foot Model 960 Wenger cooler. Cool dry air is circulated over the pellets to bring them down to a temperature of about 70°–95° F. The cool, dry conditioned air is recirculated from the Wenger cooler through a size 4.5 cyclone collector (Flex-Kleen), and a Trane size 17 Climate Changer dehumidifer having a 1/6 H.P. roll filter, and provided with two Trane condensing units (Trane Model RAVA 400-M, 40 ton, 40 HP, (4) 1½ H.P.) The dehumidified, cooled air is then recycled through the cooler to cool additional pellets.

The dry, cool pellets then drop onto a horizontal belt conveyor (18 inches wide, 10 feet 9 inches long, ⅓ H.P. drive) and are conveyed through a rotary valve S.W. No. 14, at 28 RPM, DOERR 1½ H.P. drive) into a pneumatic duct, and are transported upwardly into a pneumatic-vacuum cyclone collector (S.W., 28 inch diameter), which separates the pellets from the conveying air.

The cyclone collector discharges the cool, dry pellets directly into a 315 cubic foot bottom packing bin if a pelleted product is desired. If a crumbled product is to be made, the pellets are caused to pass through a 2-way flow diverter (manually operated), and then through a rotary valve into a Prater No. 1 Granulator (25 H.P. drive, 900 RPM). The Granulator discharges the resulting granules onto a Rotex No. 21 scalper having a No. 5 mesh screen (1½ H.P.).

From the scalper, the pellets which pass through the No. 5 screen are fed directly to the live packing bin. The oversized pellet material which is retained by the No. 5 screen is fed to a crumbling mill (Model No. 855-SA, 15 H.P., California Pellet Mill). The crumbling mill discharges the crumbled materials to a second scalper (Rotex No. 21, with 4 mesh screen, 1½

H.P. drive). The crumbles which pass through the No. 4 screen are then discharged to the live bottom packing bin to await packing.

The oversized materials at the second scalper are fed back into the downstream end of the dryer, if desired. These materials are then recycled down through the cooler, and on through the end of the system with new pellet material to be crumbled.

The live bottom packing bin is provided with collecting and discharge means in the bottom to provide a steady flow (on demand) to a scale bag packer (Howe-Richardson No. GA17). The bin discharge means presently includes four 14 inch horizontal screw feeders (at 18 RPM, each having a Dodge No. TD 425 speed reducer, all four driven by one 10 H.P., 1200 RPM motor). Disposed perpendicularly and below the four screw feeds is a horizontal collecting screw (14 inch, with Dodge No. CD418 screw conveyor drive with 5 H.P.-1800 RPM motor).

After the bags of product (either pelleted or crumbled, depending on choice of end operation) are packed and weighed at the scale bag packer, they are transferred by the operator to a bag sealer to insure that the finished product is immediately sealed into the moisture proof bags which are necessary to avoid immediate and extensive moisture pickup by these highly hygroscopic molasses/bagasse animal feed products.

Optionally, the crumbled materials may be fed directly into a block making system to make animal feed blocks of the type generally described in U.S. Pat. No. 3,246,336 issued to Baribo et al. mentioned above. Other types of blocks can be made, also, by varying the additional ingredients added, and by adjusting proportions of ingredients.

It has been discovered that the roller surfaces of the crumbling mill require a specially machined surface to effectively crumble the high molasses/bagasse pith product of the invention. When a conventional crumbling mill was employed, the pellets tended to cake and clog the mill. The improved crumbling mill design avoids caking and clogging, and produces uniform, dense granules of feed material which may be used either as a direct animal fed material, either alone, or mixed and blended with other granular feeds as a source of molasses and bagasse roughage. The granules, of course, also serve as a starting material to make animal feed blocks.

A note of caution regarding pellet operation at these high moisture levels. When attempts are made to cut the pellets into uniform lengths using the pellet mill knives, the knives become sticky, and very soon clog up the pellet mill. It has been found much more effective to allow the wet pellets to break loose from the die orifices by gravity, and after drying, the pellets can be sized.

"Start-up" operations for resuming the pelleting operation after a period of inactivity are generally opposite those described in published materials. When a "closedown" of the pelleting operation is to take place, a ground, dry mixture of corn (no molasses) is fed into the pellet mill to force all high molasses material on through the die, so that such materials will not stick and bind the die during "down times". When it is desired to start up again, a hot-dry mix is fed into the die to force the die open. A wet mix will not function until the die is open. It is presently believed that the hot mix expands the metal slightly to aid in opening the die holes.

In contrast, the prior art commences operation using a wet mix, and then dry it up after they are running. The molasses levels in the prior art systems are considerably lower, so the risk of die clogging during down time is less. Waste of pelleted material during start up, while bringing the system into operation would also appear to be considerable.

There are various quality control tests which are performed to insure that the products meet specifications. The products are sold primarily as a source of molasses, so the most important test is for sugar/molasses content which is normally expressed as molasses equivalent or as invert sugars. Equally important, from a very practical point of view, is the moisture content test. It is essential for handling finished product that the dryer and cooler system operate to effectively reduce product moisture level below that at which the products tend to cake during handling and stacking. At the present time, it is believed that a moisture content of less than 4% by weight at the time of packing product is required to preserve handling properties because these high molasses products remain hygroscopic and the climate is excessively humid. Less than 2% moisture content in bagged product is preferred for even longer product stability. In geographic locations of low relative humidity, the problem diminishes, and could disappear in dry climates.

Although the crumbled, high molasses product has more surface area, and is therefore more inclined to moisture pickup, it is a more desirable product, because it has more uses in more types of animal feeds as a good source of molasses. In addition, it is much more difficult for the animal to "sort out" the flavorful components of a mixed feed containing the smaller, crumbled product and other ingredients.

The "molasses" used for the practice of this invention can be derived from any source, including cane, beet, citrus, corn and wood molasses containing unrecovered sucrose, reducing sugars, organic nonsugars and ash. This would include so-called "first molasses," "second molasses," blackstrap molasses, refiner's syrup, barrel syrup, Steffen molasses and lactose molasses, the latter being obtained in the preparation of milk sugar.

The high density, low moisture, molasses-containing pellets, crumbles, and molasses/salt blocks make ideal animal feed components or supplements which are inexpensive and nourishing, and convenient to handle and mix with other feeds. The method of the invention insures that a high level of molasses can be fed to provide the animals all the nutrients, minerals and vitamins contained in molasses. The high degree of molasses impregnation and density of the dry product assures that it will be non-caking and free-flowing without dusting. The wet pelleting process utilizes the bagasse or bagasse pith and molasses at their normal commercial moisture levels of about 10–30% moisture, and the subsequent drying of the high molasses pellets reduces their moisture level to the minimum possible, so the dry product can be shipped at much lower costs.

We claim:

1. A process for making a high molasses animal feed, having a bulk density of at least 20 pounds per cubic foot, containing at least 60% by weight dry solids basis molasses, the steps comprising:

a. preconditioning a molasses absorptive carrier material to a moisture content of less than 5% by weight to obtain a maximum molasses absorption of at least 60% by weight dry solids molasses, based on the weight of the carrier, dry solids basis;

b. intimately mixing said absorptive carrier material with a preheated, high brix liquid molasses containing no more than about 30% by weight water to obtain a molasses/carrier blend having a moisture content in the range of at least about 10% by weight of the molasses/carrier blend;

c. wet pelleting said molasses/carrier blend at a temperature in the range of 100°–130° F. in the absence of added steam to obtain moist, thoroughly blended discrete pellets having a substantially increased bulk density and a moisture content substantially unchanged from that of the molasses/carrier blend; and d. thereafter drying said pellets to a moisture content below about 4% by weight said dry pellets containing at least 60% by weight dry solids basis molasses and having a bulk density of at least 20 pounds per cubic foot.

2. The method of claim 1, in which the molasses absorptive carrier is selected from the group consisting of sugar cane bagasse, bagasse pith, sugar beet pulp, sugar beet seeds, soybean hulls, citrus pulp, corn cob fractions, alfalfa and other forage materials, ground grain mill screenings, peanut hulls, cottonseed hulls, and dried ground portions of whole sugar cane plants.

3. The method of claim 1, in which the molasses absorptive carrier is preconditioned bagasse having been ground through a ⅛ inch screen, and dried to a moisture level of about 3–5%.

4. The method of claim 1, in which the carrier is bagasse pith which has been substantially defibered, ground, screened and dried to increase homogeneous molasses absorption throughout the remaining chopped fiber portion and pith portion of the carrier.

5. The method of claim 1, in which the molasses is selected from the group consisting of cane, beet, citrus, corn and wood molasses containing unrecovered sucrose, reducing sugars, organic non-sugars and ash, "first molasses," "second molasses," blackstrap molasses, refiner's syrup, barrel syrup, Steffen molasses and lactose molasses, and mixtures thereof.

6. The method of claim 1, in which the molasses is cane sugar molasses containing about 40–55% sugars expressed as invert, ranging from about 79°–85° Brix.

7. The method of claim 1, in which the molasses is cane sugar molasses containing about 40–55% sugars expressed as invert, ranging from about 79°–85° Brix, in which the carrier is bagasse pith which has been substantially defibered, ground, screened and dried to increase homogeneous molasses absorption throughout the remaining chopper fiber portion and pith portion of the carrier.

8. The method of claim 1, in which the density of the dry pelleted material is at least 24 pounds per cubic foot.

9. The method of claim 1, in which the absorptive carrier comprises preconditioned bagasse pith, said pith having been first subjected to grinding and screening so that substantially all of said carrier has first passed through a 3/32 inch screen prior to blending with said molasses.

10. The method of claim 9, in which said molasses is atomized and sprayed onto said carrier to obtain intimate blending and mixing.

11. The method of claim 10, in which the molasses is atomized and heated to a temperature of at least about 140° F. by means of injected steam, and is thereafter intimately mixed with said preconditioned bagasse pith to obtain an homogeneous blend of molasses and pith having a moisture content of about 15–20% and a molasses/bagasse pith ratio, of about one to four parts molasses to one part of bagasse pith, dry solids basis. % by % by 12. The method of claim 10, in which the wet pellets are first dried to less than about 4% moisture, the dry pellets contain at least 40% sugars expressed as invert, and have a bulk density of at least 27 pounds per cubic foot.

13. A dry animal feed in the form of high density hard pellets comprising a highly absorptive molasses carrier selected from the group consisting of sugar cane bagasse, bagasse pith, sugar beet pulp, sugar beet seeds, soybean hulls, citrus pulp, corn cob fractions, alfalfa and other forage materials, ground grain mill screenings, peanut hulls, cottonseed hulls, and dried ground portions of whole sugar cane plants, said carrier having been preconditioned to a moisture content of less than 5% and thereafter having been intimately blended to obtain maximum molasses absorption with at least 60% b7 weight dry solids molasses containing no more than 30% b7 weight water and wet pelleted therewith in the absence of added steam at a temperature of 100°–130° F. and at a moisture level of at least 10% by weight to form moist, dense pellets with substantially unchanged moisture content from the intimate blend, said pellets having been thereafter dried to less than 4% moisture, said pellets having a molasses content of at least 60% dry solids basis and a bulk density of at least 20 pounds per cubic foot.

14. The animal feed of claim 13, in which the molasses is selected from the group consisting of cane, beet, citrus corn and wood molasses containing unrecovered sucrose, reducing sugars, organic non-sugars and ash, "first molasses," "second molasses," blackstrap molasses, refiner's syrup, barrel syrup, Steffen molasses and lactose molasses, and mixtures thereof and the molasses carrier is preconditioned bagasse which has been defibered, ground, passed through a ⅛ inch screen, and predried to a moisture level of about 3–5% to increase homogenous molasses absorption throughout the preconditioned bagasse.

15. The animal feed of claim 13, in which the molasses is cane sugar molasses containing about 40–55% sugars expressed as invert, ranging from about 79°–85° Brix 16. The animal feed of claim 13, in which the density of the dry pelleted material is at least 24 pounds per cubic foot.

17. The animal feed of claim 13, in which the absorptive carrier comprises preconditioned bagasse pith, said pith having been first subjected to grinding and screening so that substantially all said carrier has first passed through a 3/32 inch screen prior to blending with said molasses.

18. The animal feed of claim 13, in which the molasses is first atomized and heated to a temperature of about 140° F. by means of injected steam, and is thereafter intimately mixed with preconditioned bagasse pith to obtain an homogeneous blend of molasses and pith having moisture content of about 15–20%, and a molasses/begasse pith ratio, of about one to four parts molasses to one part of bargasse pith, dry solids basis.

19. The animal feed of claim 13, in which the wet pellets are first dried to less than about 4% moisture, the dry pellets contain at least 40% sugars expressed as invert, and have a bulk density of at least 27 pounds per cubic foot.

20. The animal feed of claim 13, in which the molasses is cane sugar molasses containing about 40–55% sugars expressed as invert, ranging from about 79°–85° Brix, in which the carrier is bagasse pith which has been substantially defibered, ground, screened and dried to increase homogeneous molasses absorption throughout the remaining chopped fiber portion and pith portion of the carrier.

21. The animal feed of claim 13, in which the dry pellets are subsequently crumbled to obtain a granular animal feed having a bulk density of at least about 35 pounds per cubic foot.

22. The animal feed of claim 21, in which the dense, granular animal feed is further formed into animal feed blocks.

* * * * *